United States Patent Office 2,918,463
Patented Dec. 22, 1959

2,918,463

17-CARBOXYALKYLATED 17-HYDROXY-19-NORANDROSTEN-3-ONES

John A. Cella, Skokie, Ill., assignor to G. D. Searle & Co., Chicago, Ill., a corporation of Delaware No Drawing. Application June 12, 1958
Serial No. 741,473

7 Claims. (Cl. 260—239.57)

This invention relates to lactones of 17-carboxyalkylated 17-hydroxy-19-norandrosten-3-ones, and processes for the manufacture thereof. More particularly, this invention relates to compounds of the formula

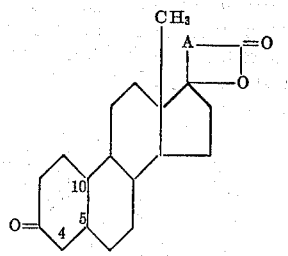

wherein A is an alkylene or alkenylene radical, and there is a double bond in either the 4(5) or the 5(10) position.

Among the radicals contemplated by A in the foregoing formula, those which contribute at least two and fewer than four carbon atoms to the lactone ring are preferred. Examples of such groupings are ethylene, vinylene, propylene, and trimethylene radicals, and radicals derived therefrom by the replacement of hydrogen with one or more lower alkyl substituents.

Equivalent to the foregoing lacetones for purposes of the present invention are the hydroxy acids respectively in equilibrium therewith

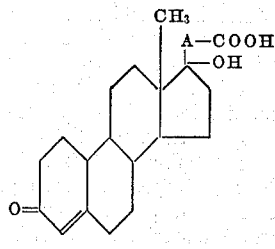

and

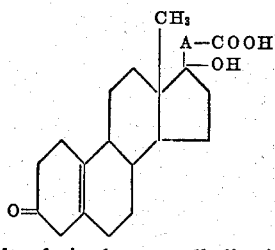

as also the salts derived upon alkalization of the said lactones and/or hydroxy acids, viz,

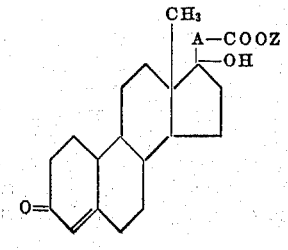

and

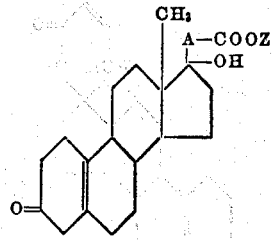

A in each of the formulas having the meaning assigned in paragraph one hereof, and Z in the salt formulas standing for an alkali metal or the ammonium radical.

The compounds of this invention are useful because of their valuable pharmacological properties. Thus, for example, the subject compositions manifest a unique capacity to block the effect of desoxycorticosterone acetate on urinary sodium and potassium, while at the same time being characterized by an independent salt-retaining action at higher concentration. Moreover, the claimed compounds are anti-hypertensive agents.

Compounds of the present invention are manufactured as follows: An appropriate 17-alkynylestradiol 3-methyl ether is carboxylated by seriatim treatment with a Grignard reagent and carbon dioxide in ethereal solvent to give the corresponding acid $n$ being zero or one in this and the following formulas, as dictated by the alkynyl substituent in the starting material. The resultant acid is reduced with lithium in a mixture of liquid ammonia and t-butyl alcohol to the intermediate salts and which on brief contact with aqueous alkanoic acid or the equivalent undergo cleavage of the ether linkages and isomerization to the $\Delta^{5(10)}$ lactones

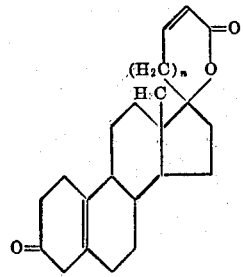

and

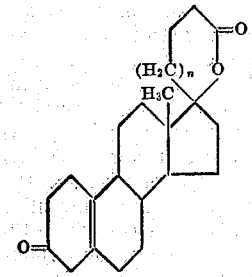

wherein, on standing with mineral acid, the double bonds shift to give the $\Delta^{4(5)}$ lactones

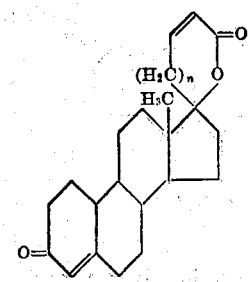

and

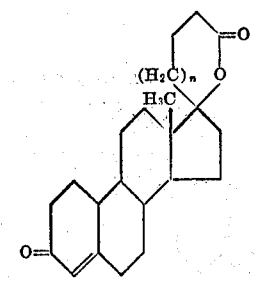

Alternatively, the alkynyl acid intermediate

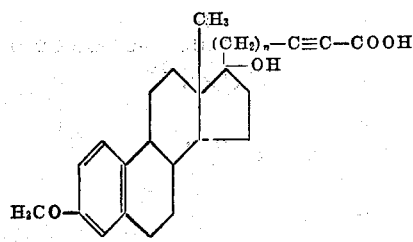

is selectively hydrogenated in the presence of a catalyst of the order of activity of palladium supported on charcoal, to produce the alkanoic acid

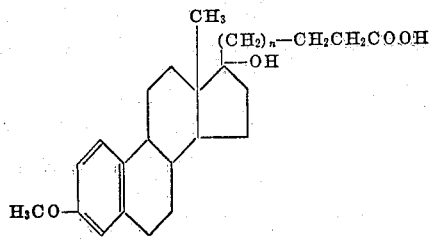

prior to reduction with lithium in ammonia and t-butyl alcohol, cleavage, and isomerization.

As an exception to the foregoing manufacturing procedure, the carboxypropylene lactones hereof are prepared from an appropriate 17-butenylestratriol 3-methyl ether, which is reduced with lithium in ammonia and t-butyl alcohol to the enol ether

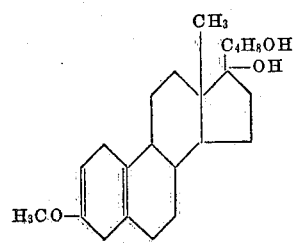

this material being hydrolyzed to the corresponding $\Delta^4$-3-one with mineral acid, and the latter product being oxidized and lactonized on treatment with chromium trioxide or the equivalent in a ketonic medium.

The following examples describe in detail certain of the compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade, pressures in pounds per square inch, and relative amounts of materials in parts by weight, except as otherwise noted.

*Example 1*

*17α-carboxyethynylestradiol 3-methyl ether.*—To a suspension of approximately 10 parts of magnesium in 180 parts of anhydrous ether is slowly added, with agitation, a solution of 44 parts of ethyl bromide in 180 parts of anhydrous ether. When the magnesium is in solution, 120 parts of dry 1,2-dimethoxyethane is cautiously introduced, following which distillation of ether is begun. Simultaneously with distillation, a solution of 20 parts of 17α-ethynylestradiol 3-methyl ether in 250 parts of 1,2-dimethoxyethane is added. Distillation is terminated when the vapor temperatures reach 70°, agitation at the boiling point under reflux being continued for 4 hours longer. The reaction mixture is then charged into an autoclave along with 200 parts of liquid carbon dioxide under 600 pounds pressure at room temperatures. This mixture is agitated overnight, whereupon contents of the autoclave are dumped into 2000 parts of water containing 20 parts of acetic acid. The precipitate which forms is filtered out and pressed. The damp magnesium bromide complex of the desired acetylenic acid thus obtained is recrystallized from 350 parts of dioxane. Recrystallization from 125 parts of 50% aqueous dioxane acidified to pH 4 with muriatic acid serves to cleave the complex and afford 17α-carboxyethynylestradiol 3-methyl ether monohydrate, melting at 200–204° (dec.). Water of crystallization is lost on heating at 120–140°. The anhydrous product has the formula

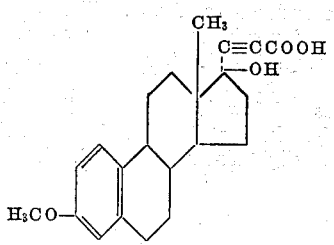

*Example 2*

*17α-(2-carboxyvinyl)-17β-hydroxy-19-norandrost-4-en-3-one lactone and 17α-(2-carboxyethyl)-17β-hydroxy-19-norandrost-4-en-3-one lactone.*—To a solution of approximately 8 parts of 17α-carboxyethynylestradiol 3-methyl ether monohydrate in 500 parts of t-butyl alcohol is added, with agitation, 700 parts of liquid ammonia. A precipitate immediately appears. With continued agitation, 8 parts of lithium wire is added over a period of 30 minutes. As addition of the lithium is completed, a mobile bronze phase appears in the reaction mixture, and the characteristic blue of the liquid ammonia solution disappears. Much of the precipitate dissolves at this point. An additional 200 parts of ammonia is introduced, thereby regenerating the blue color above remarked. After another hour, no trace of either blue or bronze phase remains, and the reaction is complete. Ammonia is blown off in a stream of nitrogen overnight, following which t-butyl alcohol is stripped by vacuum distillation. The white residue is mixed at room temperatures with a combination of 75 parts of acetic acid and 250 parts of water. This mixture is extracted with ether to remove the white precipitate present, whereupon solvent is evaporated from the extract, leaving a residue which is taken up in a mixture of 50 parts of methyl alcohol and 2 parts of muriatic acid. The resultant solution is allowed to stand at room temperatures for 1 hour, whereupon dilution with water is effected, and the mixture thus obtained is extracted with ether. The ether extract is stripped of solvent by evaporation, and the residue purified by chromatography on silica gel, using benzene and ethyl acetate as developing solvents. From the eluate comprising 5% ethyl acetate and 95% benzene is obtained 17α-(2-carboxyvinyl)-17β-hydroxy-19-norandrost-4-en-3-one lactone, melting at 117–118°. This material has the formula

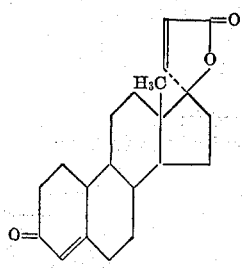

From the eluate comprising 10% ethyl acetate and 90% benzene, there is obtained 17α-(2-carboxyethyl)-17β-hydroxy-19-norandrost-4-en-3-one lactone, the melting point of which is approximately 126.5–127°. The product solidifies above this melting point and melts again at 137–138°. 17α-(2-carboxyethyl)-17β-hydroxy-19-norandrost-4-en-3-one lactone has the formula

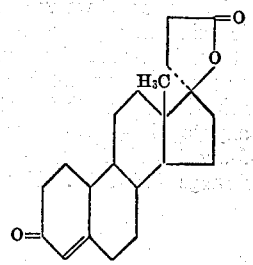

*Example 3*

*17α-(2-carboxyvinyl)-17β-hydroxy-19-norandrost-5(10)-en-3-one lactone and 17α-(2-carboxyethyl)-17β-hydroxy-19-norandrost-5(10)-en-3-one lactone.*—The material obtained on evaporation of solvent from the ethereal extract of the acetic acid hydrolyzate derived from the reaction product of Example 2, namely, the residue referred to in column 5, line 45, of this specification, comprises a mixture of the $\Delta^{5(10)}$ carboxyvinyl and carboxyethyl compounds hereinafter claimed, and is chromatographically resolved by substantially the same technique set forth above (Example 2) for the separation of the corresponding $\Delta^{4(5)}$ products. The adsorbate used is silica gel, with benzene and ethyl acetate as developing solvents. The 17α-(2-carboxyvinyl)-17β-hydroxy-19-norandrost-5(10)-en-3-one lactone thus obtained shows no significant peak in the ultraviolet spectrum at 240 mμ, confirming absence of the 4(5) double bond, and is likewise non-absorptive in the 278 mμ region, there being no aromatic impurities present. The product has the formula

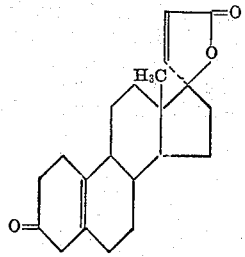

The 17α-(2-carboxyethyl)-17β-hydroxy-19-norandrost-5(10)-en-3-one lactone concurrently isolated is still further purified by recrystallization from ethyl acetate, the resultant product melting at 173–179° and having the formula

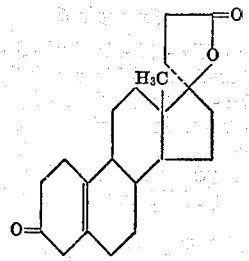

*Example 4*

*17α-(3-carboxypropyl)-17β-hydroxy-19-norandrost-5(10)-en-3-one hemihydrate.*—To a solution of approximately 50 parts of 17α-(3-carboxypropyl)-3-methoxyestra-1,3,5(10)-trien-17β-ol in a mixture of 1000 parts of t-butyl alcohol with 1100 parts of tetrahydrofuran is added, cautiously with agitation, 2000 parts of liquid ammonia. There is then introduced, portionwise, 2500 parts of lithium wire over a 10-minute period, agitation being continued the while. After about 3 hours, decolorization of the blue solution occurs, at which point 112 parts of methyl alcohol is slowly added. The ammonia is then permitted to volatilize. There is next introduced several volumes of water and then, carefully, aqueous muriatic acid q.s. a pH of 3. The precipitate which is thrown down is removed by filtration and washed with water. The product thus obtained, upon drying in air and recrystallization from ethyl acetate, affords pure 17α - (3 - carboxypropyl) - 17β - hydroxy - 19 - norandrost-5(10)-en-3-one hemihydrate, the melting point of which is in the range 114–119°. The product has the formula

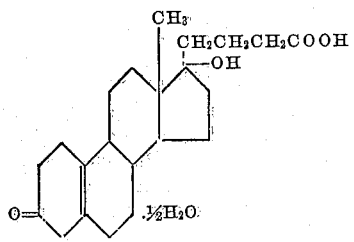

Example 5

*17α - (3 - carboxypropyl) - 17β - hydroxy - 19 - norandrost-4-en-3-one lactone.*—A suspension of 22 parts of 17α - (3 - carboxypropyl) - 17β - hydroxy - 19 - norandrost-5(10)-en-3-one hemihydrate in a mixture of 180 parts of methyl alcohol, 24 parts of muriatic acid, and 35 parts of water is warmed slightly to effect solution, whereupon the reactants are let stand at room temperature for 2 hours. The solution is then dumped into several volumes of water. A gummy product separates, which is thoroughly washed with water and then dissolved in benzene. Residual water is removed by azeotropic distillation, following which the product is chromatographed on silica gel, using benzene and ethyl acetate as developing solvents. There is obtained by this means the desired 17α-(3-carboxypropyl)-17β-hydroxy-19-norandrost-4-en-3-one lactone which, twice crystallized from a mixture of ethyl acetate and isopropyl ether, melts in the range 144–149°. The product has the formula

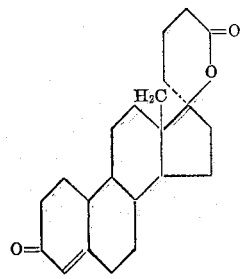

Example 6

*17β - hydroxy - 17α - (1 - methyl - 3 - hydroxypropyl)-19-norandrost-4-en-3-one.*—To a solution of 10 parts of 3 - methoxy - 17α - (1 - methyl - 3 - hydroxypropyl)estra-1,3,5(10)-trien-17β-ol in a mixture of 115 parts of distilled liquid ammonia, 55 parts of t-butyl alcohol, and 67 parts of tetrahydrofuran is added, with agitation under reflux, 4 parts of lithium. The mixture quickly becomes blue. After 5 hours, excess lithium is destroyed by the cautious addition of 46 parts of methyl alcohol. The ammonia is then allowed to boil off, following which ten volumes of water is introduced and the tetrahydrofuran thereupon removed by distillation at 30° C. in vacuo. The solid product is collected by filtration and taken up in ether. The ether solution, dried over anhydrous potassium carbonate, is stripped of solvent by distillation. The residue is the enol ether, which is allowed to stand for 2 hours at room temperature in contact with 83 parts of a hydrolyzing mixture consisting of 15 parts of methyl alcohol, 1 part of water, and 1 part of muriatic acid. The mixture is next diluted with 430 parts of water, at which point the methyl alcohol is removed by distillation at reduced pressures. The distilland, when free of alcohol, is extracted with ethyl acetate. This extract is washed with saturated aqueous sodium chloride, dried over anhydrous sodium sulfate, and finally stripped of solvent by distillation. The residual oil is crystallized from a mixture of ether and ethyl acetate. Recrystallization from a mixture of ether and acetone, followed by vacuum drying for 2 hours at 60°, affords the desired 17β-hydroxy-17α-(1-methyl-3-hydroxypropyl)-19-norandrost-4-en-3-one. The material melts in the range 80–90°, resolidifies at higher temperatures, melts again in the range 154–158°, and becomes a clear solution at 160°. Vacuum sublimation at 150° produces an amorphous solid which melts in the range 55–70°, resolidifies when held at 100°, and then melts again at 156–158°, with slight sintering at 146°. The product has the formula

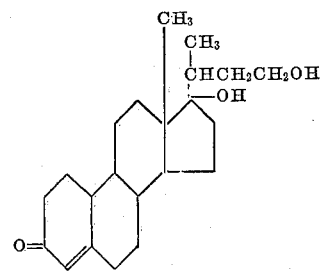

Example 7

*17β - hydroxy - 17α - (1 - methyl - 2 - carboxyethyl)-19-norandrost-4-en-3-one lactone.*—To a vigorously agitated solution of 1 part of 17β-hydroxy-17α-(1-methyl-3-hydroxypropyl)-19-norandrost-4-en-3-one in 38 parts of acetone at substantially room temperature is added just enough of a solution consisting of 2 parts of chromium trioxide in 6 parts of water plus 3 parts of concentrated sulfuric acid to produce a permanent orange color. Agitation is continued for an additional 5 minutes, at which point sufficient isopropyl alcohol is added to destroy excess oxidant. Approximately 90 parts of water is then introduced, acetone is distilled off under reduced pressures, and the residue is extracted with ethyl acetate. The extract is washed consecutively with water and saturated aqueous sodium chloride, then dried over anhydrous sodium sulfate. Solvent is removed by distillation, and the residue thus obtained is crystallized from acetone. The 17β - hydroxy - 17α - (1 - methyl - 2 - carboxyethyl)-19-norandrost-4-en-3-one lactone so produced melts at 192–193°, with slight sintering at 190–191°. The product has the formula

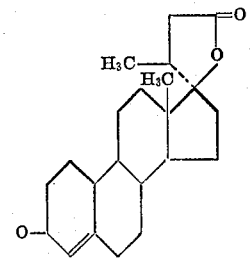

What is claimed is:
1. A compound of the formula

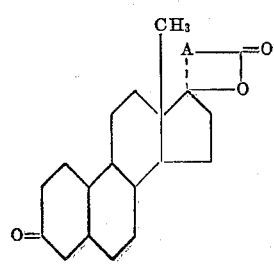

wherein A is selected from the group consisting of ethylene, vinylene, propylene, and trimethylene radicals; and there is a double bond in solely one of the positions 4(5) and 5(10).

2. 17α - (2 - carboxyvinyl) - 17β - hydroxy - 19 - norandrost-4-en-3-one lactone.

3. 17α - (2 - carboxyethyl) - 17β - hydroxy - 19 - norandrost-4-en-3-one lactone.

4. 17α - (2 - carboxyvinyl) - 17β - hydroxy - 19 - norandrost-5(10)-en-3-one lactone.

5. 17α - (2 - carboxyethyl) - 17β - hydroxy - 19 - norandrost-5(10)en-3-one lactone.

6. 17α - (3 - carboxypropyl) - 17β - hydroxy - 19 - norandrost-4-en-3-one lactone.

7. 17β - hydroxy - 17α - (1 - methyl - 2 - carboxyethyl)-19-norandrost-4-en-3-one lactone.

No references cited.